US012810534B2

(12) United States Patent
Chen et al.

(10) Patent No.: US 12,810,534 B2
(45) Date of Patent: Nov. 24, 2026

(54) EFFECT VIDEO DETERMINING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Jiajun Chen, Beijing (CN); Yunhao Liao, Beijing (CN); Huaiye Shen, Beijing (CN); Sheng Zhang, Beijing (CN); Shen Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/930,049

(22) Filed: Oct. 29, 2024

(65) Prior Publication Data

US 2025/0054225 A1 Feb. 13, 2025

Related U.S. Application Data

(63) Continuation of application No. PCT/CN2023/080505, filed on Mar. 9, 2023.

(30) Foreign Application Priority Data

Apr. 29, 2022 (CN) ........................ 202210474744.1

(51) Int. Cl.
*G06T 15/20* (2011.01)
*G06T 5/77* (2024.01)
(Continued)

(52) U.S. Cl.
CPC ................ *G06T 15/20* (2013.01); *G06T 5/77* (2024.01); *G06V 10/25* (2022.01); *H04N 21/816* (2013.01)

(58) Field of Classification Search
None
See application file for complete search history.

(56) References Cited

U.S. PATENT DOCUMENTS

2004/0148576 A1* 7/2004 Matveyenko ......... G06F 40/143 715/273
2004/0240733 A1* 12/2004 Hobson ............... G06V 10/507 382/190

(Continued)

FOREIGN PATENT DOCUMENTS

CN 101309389 A 11/2008
CN 107566853 A 1/2018

(Continued)

OTHER PUBLICATIONS

Zhu, H. et al., "Application of Panoramic Photography in Architectural Engineering," Civil and Architectural Engineering Information Technology, vol. 9, No. 4, Aug. 15, 2017, 13 pages.

(Continued)

*Primary Examiner* — Anh-Tuan V Nguyen
(74) *Attorney, Agent, or Firm* — Alleman Hall LLP

(57) ABSTRACT

An effect video determining method, an effect video determining apparatus, an electronic device, and a storage medium are provided by embodiments of the present disclosure. The method includes: obtaining an uploaded image in response to an effect trigger operation; determining, according to position information of a capturing device, a target perspective image from a 3D image surrounding scenario corresponding to the uploaded image; and generating and displaying an effect video frame based on the target perspective image and a target object, until receiving an operation to stop capturing an effect video.

20 Claims, 2 Drawing Sheets

(51) Int. Cl.

| | |
|---|---|
| ***G06V 10/25*** | (2022.01) |
| ***H04N 21/81*** | (2011.01) |

(56) References Cited

U.S. PATENT DOCUMENTS

| | | | |
|---|---|---|---|
| 2006/0048057 A1* | 3/2006 | Herberger | G06F 16/258 |
| 2007/0126864 A1 | 6/2007 | Bhat et al. | |
| 2008/0063248 A1 | 3/2008 | Young et al. | |
| 2009/0031328 A1* | 1/2009 | Estrop | H04N 7/012 719/323 |
| 2009/0262181 A1 | 10/2009 | Rotem et al. | |
| 2010/0225669 A1* | 9/2010 | Park | G09G 5/005 345/698 |
| 2016/0189619 A1* | 6/2016 | Park | G09G 3/3233 345/77 |
| 2018/0165830 A1* | 6/2018 | Danieau | G06F 3/012 |
| 2019/0052858 A1* | 2/2019 | Yip | H04N 13/161 |
| 2019/0082118 A1 | 3/2019 | Wang et al. | |
| 2019/0089643 A1* | 3/2019 | Westphal | H04N 21/44209 |
| 2019/0108666 A1* | 4/2019 | Su | G06T 11/60 |
| 2019/0246104 A1* | 8/2019 | Liu | H04N 13/275 |
| 2019/0286934 A1* | 9/2019 | Lai | G06T 7/11 |
| 2019/0289205 A1* | 9/2019 | Lin | H04N 23/698 |
| 2019/0355172 A1* | 11/2019 | Dsouza | G06F 3/017 |
| 2020/0030571 A1* | 1/2020 | Esch Duran | A61M 21/02 |
| 2020/0353826 A1* | 11/2020 | Yaldo | B60L 53/66 |
| 2021/0075977 A1* | 3/2021 | Yoo | H04N 5/272 |
| 2022/0319141 A1* | 10/2022 | Liu | G06V 20/70 |
| 2023/0283864 A1* | 9/2023 | Loghmani | G06F 1/1694 725/37 |

FOREIGN PATENT DOCUMENTS

| | | | |
|---|---|---|---|
| CN | 107608605 | A | 1/2018 |
| CN | 108876729 | A | 11/2018 |
| CN | 108989681 | A | 12/2018 |
| CN | 111464761 | A | 7/2020 |
| CN | 112153472 | A | 12/2020 |
| CN | 112203078 | A | 1/2021 |
| CN | 112995491 | A | 6/2021 |
| CN | 113115110 | A | 7/2021 |
| CN | 113840049 | A | 12/2021 |
| CN | 113850746 | A | 12/2021 |
| CN | 113973173 | A | 1/2022 |
| CN | 114025105 | A | 2/2022 |
| CN | 114900621 | A | 8/2022 |
| CN | 114900621 | B | 8/2024 |
| GB | 2555916 | A | 5/2018 |
| JP | 2001155468 | A | 6/2001 |
| JP | 2009253921 | A | 10/2009 |
| JP | 2019140567 | A | 8/2019 |

OTHER PUBLICATIONS

China National Intellectual Property Administration, Office Action and Search Report Issued in Application No. 202210474744.1, May 10, 2024, 16 pages.

ISA China National Intellectual Property Administration, International Search Report and Written Opinion Issued in Application No. PCT/CN2023/080505, Jun. 19, 2023, WIPO, 20 pages.

Notice of Reasons for Refusal for Japanese Application No. 2024-563553, mailed May 27, 2025, 15 pages.

European Patent Office, Extended European Search Report Issued in Application No. 23794790.8, Jun. 12, 2025, Germany, 10 pages.

* cited by examiner

EFFECT VIDEO DETERMINING METHOD AND APPARATUS, ELECTRONIC DEVICE, AND STORAGE MEDIUM

CROSS-REFERENCE TO RELATED APPLICATIONS

This application is a continuation of International Patent Application No. PCT/CN2023/080505, filed on Mar. 9, 2023, which claims the priority to and benefits of the Chinese Patent Application No. 202210474744.1, which was filed on Apr. 29, 2022. All the aforementioned patent applications are hereby incorporated by reference in their entireties.

TECHNICAL FIELD

Embodiments of the present disclosure relate to a field of image processing technology, for example, relate to an effect video determining method, an effect video determining apparatus, an electronic device, and a storage medium.

BACKGROUND

With the development of network technology, more and more applications have entered lives of users, especially a series of software that may capture short videos, which are deeply loved by the users.

In order to enhance fun of video capturing, relevant application software may provide users with various effect video production functions. However, the current effect video production functions provided for the users are very limited, and fun of the finally obtained effect video needs to be further improved. Meanwhile, personalized needs of the users to change the background picture in the video may not be taken into consideration, which reduces user experience.

SUMMARY

The present disclosure provides an effect video determining method, an effect video determining apparatus, an electronic device, and a storage medium, which can take a portion of content in an image uploaded by a user as a background, so that the effect video presents a visual effect of a scenario that a target object is located within the uploaded image, thus achieving personalized needs of the user.

In a first aspect, the embodiments of the present disclosure provide an effect video determining method, comprising:

- obtaining an uploaded image in response to an effect trigger operation;
- determining, according to position information of a capturing device, a target perspective image from a 3D image surrounding scenario corresponding to the uploaded image; and
- generating and displaying an effect video frame based on the target perspective image and a target object, until receiving an operation to stop capturing an effect video.

In a second aspect, the embodiments of the present disclosure further provide an effect video determining apparatus, comprising:

- an image acquiring module, configured to obtain an uploaded image in response to an effect trigger operation;
- a target perspective image module, configured to determine, according to position information of a capturing device, a target perspective image from a 3D image surrounding scenario corresponding to the uploaded image; and
- an effect video frame generating module, configured to generate and display an effect video frame based on the target perspective image and a target object, until receiving an operation to stop capturing an effect video.

In a third aspect, the embodiments of the present disclosure further provide an electronic device, and the electronic device comprises:

- one or more processors; and
- a storage apparatus, configured to store one or more programs,
- wherein the one or more programs, when executed by the one or more processors, cause the one or more processors to implement the effect video determining method according to any one of the embodiments of the present disclosure.

In a fourth aspect, the embodiments of the present disclosure further provide a storage medium comprising computer-executable instructions, and the computer-executable instructions, when executed by a computer processor, are configured to execute the effect video determining method according to any one of the embodiments of the present disclosure.

BRIEF DESCRIPTION OF DRAWINGS

Throughout the accompanying drawings, identical or similar reference signs represent identical or similar elements. It should be understood that, the accompanying drawings are schematic, and components and elements may not be necessarily drawn to scale.

DETAILED DESCRIPTION

It should be understood that the various steps described in the method implementations of the present disclosure may be performed according to different orders and/or in parallel. Furthermore, the method implementations may include additional steps and/or omit performing the illustrated steps. The scope of the present disclosure is not limited in this aspect.

As used herein, the terms "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." Relevant definitions of other terms will be given in the description below.

It should be noted that concepts such as the "first," "second," or the like mentioned in the present disclosure are only used to distinguish different devices, modules or units, and are not used to limit the interdependence relationship or the order of functions performed by these devices, modules or units. It should be noted that the modifications of "a," "an," "a plurality of," and the like mentioned in the present disclosure are illustrative rather than restrictive, and those skilled in the art should understand that unless the context clearly indicates otherwise, these modifications should be understood as "one or more."

The names of messages or information exchanged between multiple devices in the implementations of the present disclosure are only for illustrative purposes, and are not intended to limit the scope of these messages or information.

Before introducing the technical solution of the present disclosure, application scenarios according to the embodiments of the present disclosure may be exemplarily illustrated at first. Exemplarily, when a user captures a video through application software or has a video call with other users, the user may want to make the captured video have more fun, and at the same time, the user may also have personalized needs for pictures of an effect video. For example, some users may want to replace the background in the video picture with a specific content. In this case, according to the technical solution of this embodiment, after an image uploaded by the user is obtained, a target perspective image may be determined from a 3D image surrounding scenario corresponding to the image, so that the target perspective image may be fused with a target object to generate an effect video, thereby enabling the effect video picture to present a visual effect of a scenario that the target object is located within the uploaded image.

Figure 1:
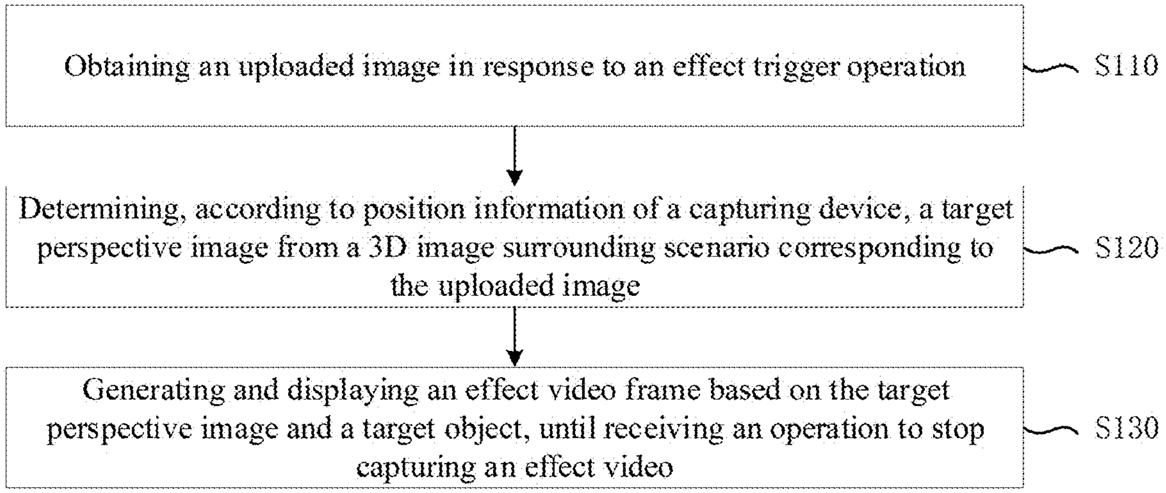
FIG. 1 is a schematic flowchart of an effect video determining method provided by an embodiment of the present disclosure.

FIG. 1 is a schematic flowchart of an effect video determining method provided by an embodiment of the present disclosure. The embodiments of the present disclosure are applicable to the case of generating an effect video having more fun while meeting personalized needs of the user. The method may be executed by an effect video determining apparatus, the apparatus may be implemented in a form of software and/or hardware, for example, implemented through an electronic device, and the electronic device may be a mobile terminal, a PC terminal, a server, or the like.

As illustrated in FIG. 1, the method includes:

S110: obtaining an uploaded image in response to an effect trigger operation.

Here the apparatus for executing the effect video determining method provided by the embodiments of the present disclosure may be integrated into application software that supports an effect video processing function, and the software may be installed in an electronic device. For example, the electronic device may be a mobile terminal, a PC terminal, or the like. The application software may be a type of software that processes images/videos, and here will not go into details about specific application software, as long as image/video processing can be achieved. The application software may also be a specially developed application in software that can add and show effects, or the application software may also be integrated into a corresponding page, so that the user can process the effect video through the integrated page on the PC terminal.

It should be noted that the technical solution of this embodiment may be executed during a real-time capturing process based on the mobile terminal, or may also be executed after the system receives video data actively uploaded by the user. For example, when the user captures a video in real time based on a camera apparatus on a terminal device, in response to detecting an effect trigger operation, the application software may respond to the operation, so as to obtain the uploaded image and process the video currently captured by the user to obtain an effect video. Alternatively, when the user actively uploads video data through application software and executes an effect trigger operation, the application may also respond to the operation, so as to process the video data actively uploaded by the user after obtaining the uploaded image, thereby obtaining an effect video.

For example, in response to the effect trigger operation, an image uploading box is popped up, and the uploaded image is determined based on a trigger operation on the image uploading box.

Here the effect trigger operation includes at least one of: triggering an effect video production control, monitoring an effect addition instruction included in voice information, or detecting a face image included on a display interface. For example, a control for triggering and running an effect video production program may be pre-developed in the application software, the control is just the effect video production control, and based on this, when detecting a user triggering the control, the application may run the effect video production program to process the uploaded image obtained. Alternatively, voice information may also be collected based on a microphone array deployed on the terminal device, and the voice information is analyzed and processed. If a processing result includes vocabulary of effect video processing, it indicates that a function of effect processing on the current video is triggered. The advantages of determining whether to execute effect video processing based on a content of the voice information may include that: interaction between the user and the display page is avoided, which improves intelligence of effect video processing. In another implementation, it may be determined whether a user face image is included in a field of view according to a capture field of view of the mobile terminal. When detecting the user face image, the application software may take the event of detecting the face image as a trigger operation for effect processing of the video. Those skilled in the art should understand that an event to be specifically selected as a condition for effect video processing may be set according to actual situations, which will not be specifically limited in the embodiments of the present disclosure.

In this embodiment, in response to the effect trigger operation, the application software may obtain the uploaded image. For example, when detecting that the image uploading box is triggered, the application software invokes an image library to take an image triggered to be selected in the image library as the uploaded image; or, when detecting that the image uploading box is triggered, the application software invokes a camera apparatus to capture the uploaded image based on the camera apparatus.

Here the uploaded image is an image actively uploaded by the user, for example, a panoramic image displaying a picture of a certain scenic spot. The image uploading box is a pre-developed control integrated into the application software, for example, a circular icon containing a plus sign. Based on this, when the user triggers an image uploading control, the user may either trigger the application software to invoke the image library on the mobile terminal, or trigger the application software to invoke a cloud image library associated therewith, thereby determining the uploaded image according to a selection result of the user. Alternatively, the user may also trigger the application software to invoke a relevant interface of a camera apparatus of the mobile terminal, so as to obtain the image captured by the camera apparatus and take the image as the uploaded image.

Exemplarily, when the user uses the camera apparatus of the mobile terminal to capture a video in real time and triggers the image uploading box displayed on the display interface, the application software may automatically open an "album" in the mobile terminal according to the trigger operation of the user on the image uploading box, and display images in the "album" on the display interface. When detecting a trigger operation of a user on a certain image, it indicates that the user wants to take a picture of the image as a background of the effect video, for example, the image selected by the user will be uploaded to a server or a client corresponding to the application software, so that the application software takes the image as the uploaded image. Alternatively, when the user uses the camera apparatus of the mobile terminal to capture a video in real time and triggers the image uploading box displayed on the display interface, the application software may directly obtain a video frame at the current moment in the video captured by the camera apparatus in real time, and take the video frame as the uploaded image. Certainly, in the actual application process, when the uploaded image is a panoramic image, the application may acquire a plurality of video frames in response to the trigger operation of the image uploading box, and splice pictures of the plurality of video frames, so as to take the finally obtained image as the uploaded image. Here the embodiments of the present disclosure will not go into details.

For example, after the uploaded image is determined, pixel ratio information of the uploaded image may also be determined; the uploaded image is processed to be a completed image with a target pixel ratio according to the pixel ratio information and a preset pixel ratio; and the 3D image surrounding scenario is determined based on the completed image.

Here the pixel ratio information of the uploaded image may be represented by an aspect ratio of the image. For example, when a width of the uploaded image is six units of length and a height is one unit of length, an aspect ratio thereof is 6:1, and correspondingly, the pixel ratio information thereof is also 6:1. In this embodiment, when obtaining the uploaded image, the application software may automatically determine the pixel ratio information of the uploaded image by running an image attribute determination program. Certainly, in the actual application process, when the uploaded image carries information that represents an aspect ratio per se, the application software may also directly invoke the information, so as to take the attribute information as the pixel ratio information of the uploaded image.

In this embodiment, the preset pixel ratio is image aspect ratio information preset based on the application software. It may be understood that the preset pixel ratio is a judgment basis for the application software to choose a way to process the uploaded image. For example, the preset pixel ratio may be set to 4:1. Certainly, in the actual application process, the parameter may be adjusted according to actual needs of effect video processing, which will not be specifically limited in the embodiments of the present disclosure.

In this embodiment, when obtaining the uploaded image and determining the preset pixel ratio and the pixel ratio information of the uploaded image, the application software may complete the uploaded image based on the above-described information. Here when the pixel ratio information of the uploaded image is inconsistent with the preset pixel ratio, the completed image is an image obtained by filling a content of the uploaded image and adjusting the aspect ratio of the uploaded image. For example, when the pixel ratio information of the uploaded image is greater than the preset pixel ratio, the application software may complete a top portion and a bottom portion of the uploaded image; and when the pixel ratio information of the uploaded image is less than the preset pixel ratio, the application software may complete a left side and a right side of the uploaded image. It may be understood that the pixel ratio information of the completed image is consistent with the preset pixel ratio, and the completion process of the uploaded image will be described below.

In this embodiment, under the condition of the pixel ratio information being greater than the preset pixel ratio, pixel points are filled by taking a long edge of the uploaded image as a filling reference to obtain a completed image with the target pixel ratio; or, under the condition of the pixel ratio information being greater than the preset pixel ratio, the uploaded image is clipped to obtain the completed image with the target pixel ratio.

In this embodiment, when the pixel ratio of the uploaded image is greater than the preset pixel ratio, it indicates that a ratio of a long edge to a short edge of the uploaded image is too great, which may be understood as that when the long edges of the uploaded image correspond to an upper side and a lower side of the image, the application software needs to complete the top portion and the bottom portion of the uploaded image.

For example, the application software needs to determine a plurality of rows of pixel points in the uploaded image and select pixel points in the top row. For example, the application software may read RGB values of the plurality of pixel points in the row and calculate an RGB average value of the pixel points in the row according to a pre-written average value function. It may be understood that a calculation result is an average value of the top pixels of the uploaded image. Similarly, the process of determining an RGB average value of pixel points in the bottom row of the uploaded image is similar to the above-described process, and details will not be repeated in the embodiments of the present disclosure. When determining the RGB average value of the pixel points in the top row and the RGB average value of the pixel points in the bottom row, the application needs to determine a region at the top portion and a region at the bottom portion of the uploaded image, respectively, that is, a region connected with the top portion of the uploaded image and a region connected with the bottom portion of the uploaded image. For example, the color of the region connected with the top portion is filled according to the RGB average value of the pixel points in the top row, and meanwhile, the color of the region connected with the bottom portion is filled according to the RGB average value of the pixel points in the bottom row, so as to obtain the completed image that reaches the preset pixel ratio.

In this embodiment, when the pixel ratio information of the uploaded image is greater than the preset pixel ratio, if the top portion and the bottom portion of the uploaded image each merely have a region connected therewith and filled with a color according to its corresponding RGB average value, the preliminarily obtained completed image may have a poor display effect, that is to say, the upper boundary and the lower boundary of the uploaded image each have a connection with the newly added region too abrupt. Therefore, in order to improve the display effect of the obtained completed image, a transition region with a specific width may also be determined in the top region and the bottom region of the original uploaded image, respectively.

In this embodiment, when the pixel ratio information of the uploaded image is greater than the preset pixel ratio, the uploaded image may also be clipped. For example, when the pixel ratio information of the uploaded image is 8:1 while the preset pixel ratio is 4:1, the application may directly clip the left side and the right side of the uploaded image respectively, that is, a content with two units of length is clipped along a long edge on the left side of the uploaded image, and a content with two units of length is clipped along a long edge on the right side of the uploaded image. It may be understood that the completed image obtained through clipping may also meet the requirements of the preset pixel ratio.

For example, a pixel filling width is determined according to the target pixel ratio and the pixel ratio information. The pixel points may be filled according to the pixel filling width by taking one long edge of the uploaded image as a reference to obtain the completed image; or the pixel points may be filled according to the pixel filling width by taking two long edges of the uploaded image as a reference to obtain the completed image. The pixel value of the pixel point within the pixel filling width is matched with a pixel value of a corresponding long edge.

Here the application software may determine corresponding edge width information according to the preset transition ratio. The edge width information is used for dividing a certain region within the uploaded image. For example, when the preset transition ratio is 1/8 and a width of a short edge of the uploaded image is eight units of length, the application may determine a first edge width with one unit of length in the top region of the uploaded image according to the above-described information, and meanwhile determine a second edge width with one unit of length in the bottom region of the uploaded image according to the above-described information. It may be understood that in the actual application process, when the top portion and the bottom portion of the uploaded image have different preset transition ratios, edge width values of the top portion and the bottom portion of the image finally determined by the application may also be different, and the specific preset transition ratio may be adjusted according to actual needs, which will not be specifically limited in the embodiments of the present disclosure.

When determining a total of two units of length in the top region and the bottom region of the uploaded image, respectively, the application may read pixel values of a plurality of rows of pixel points within one unit length in the top portion, and read pixel values of a plurality of rows of pixel points within one unit length in the bottom portion. For example, by substituting the pixel values of the plurality of rows of pixel points in the top portion and the top pixel average value into the pre-written average value calculation function, a plurality of pixel average values respectively corresponding to a plurality of rows of pixel points within one unit of length in the top region may be obtained. Similarly, by substituting the pixel values of the plurality of rows of pixel points in the bottom portion and the bottom pixel average value into the pre-written average value calculation function, a plurality of pixel average values respectively corresponding to a plurality of rows of pixel points within one unit of length in the bottom region may be obtained. It may be understood that the calculated pixel average values respectively corresponding to the plurality of rows of pixel points are transition pixel values of the uploaded image.

Finally, color attribute information of corresponding pixel points is updated according to the transition pixel values of the plurality of rows of pixel points, and the corresponding pixel points are assigned with the color attribute information according to the top pixel average value and the bottom pixel average value, so as to obtain the completed image corresponding to the uploaded image. Meanwhile, a transition region is divided in the top portion of the uploaded image and a completion region is added, as well as a transition region is divided in the bottom portion of the uploaded image and a completion region is added, so that the obtained completed image reaches the target pixel ratio. In the actual application process, the target pixel ratio may be 2:1, and of course, in the actual application process, the target pixel ratio may be adjusted according to real-time effect video processing requirements, which will not be specifically limited in the embodiments of the present disclosure.

Exemplarily, when the pixel ratio information of the uploaded image is 8:1 and the preset pixel ratio is 4:1, the application software needs to add a plurality of rows of pixel points to the top portion and the bottom portion of the uploaded image, respectively. It should be noted that in the process of adding the plurality of rows of pixel points, the number of rows of pixel points added to the top portion may be consistent with the number of rows of pixel points added to the bottom portion. After the plurality of rows of pixel points are added, the application may assign color attribute information to the plurality of rows of pixel points added to the top portion according to the top pixel average value (i.e., the RGB average value of the top row of pixel points), and assign color attribute information to the plurality of rows of pixel points added to the bottom portion according to the bottom pixel average value (i.e., the RGB average value of the bottom row of pixel points). For example, according to the preset transition ratio and the short edge width information of the uploaded image, two transition regions may be respectively divided from the top region and the bottom region of the uploaded image. After the pixel average value of the plurality of rows of pixel points in the transition region is obtained through calculation, the original color attribute information of the pixel points within the two regions may be updated based on the pixel average value, so as to obtain the completed image with a pixel ratio of 2:1 corresponding to the uploaded image.

In this embodiment, when the pixel ratio of the uploaded image is greater than the preset pixel ratio, a plurality of rows of pixel points are added to the top portion and the bottom portion of the uploaded image, and the transition region is divided on the uploaded image according to the preset transition ratio, which may have advantages in that: the obtained completed image reaches the target pixel ratio, so as to facilitate the subsequent processing on the image performed by the application, and meanwhile, the display effect of the image is also improved, so that the finally rendered image content is more natural.

In this embodiment, there may also be the case that the pixel ratio information of the uploaded image is less than the preset pixel ratio. For example, if the pixel ratio information is less than the preset pixel ratio, the uploaded image is performed with mirror processing, so as to obtain the completed image with the target pixel ratio.

Those skilled in the art should understand that image mirror processing may be divided into three types: horizontal mirroring, vertical mirroring, and diagonal mirroring. In this embodiment, since the pixel ratio information of the uploaded image is less than the preset pixel ratio, the uploaded image needs to be performed with horizontal mirroring, that is, the picture of the uploaded image is swapped in a mirroring manner with respect to a left edge axis or a right edge axis of the image as a center, so as to obtain a plurality of uploaded images arranged horizontally. It may be understood that, with respect to any two adjacent images, pictures of the images will present a visual effect of mirror swapping. For example, when an image obtained by splicing a plurality of mirrored images reaches the target pixel ratio, the spliced image is the completed image corresponding to the uploaded image.

It should be noted that if the pixel ratio information is less than the preset pixel ratio and equal to the target pixel ratio, the uploaded image is taken as a completed image. That is to say, before processing the uploaded image, when a ratio of the long edge to the short edge of the uploaded image is already equal to the target pixel ratio, the application directly takes the uploaded image as a completed image used in the subsequent process without performing completion processing on the uploaded image. Here the embodiments of the present disclosure will not go into details.

In this embodiment, after determining the completed image corresponding to the uploaded image, the application software may determine the corresponding 3D image surrounding scenario according to the completed image, for example, determine six patch textures corresponding to a cuboid bounding box based on the completed image, and determine the 3D image surrounding scenario corresponding to the uploaded image based on the six patch textures.

Here the 3D image surrounding scenario is composed of at least six patch textures, and meanwhile, the 3D image surrounding scenario corresponds to a cuboid composed of at least six patches. Those skilled in the art should understand that a patch refers to a mesh in the application software that supports image rendering, which may be understood as an object used for carrying the image in the application software. Each patch is composed of two triangles and includes a plurality of vertices, and correspondingly, a patch to which these vertices belong may also be determined according to information of these vertices. Based on this, it may be understood that in this embodiment, the six patches of the 3D image surrounding scenario each carry a portion of picture on the completed image, so that a picture on each patch is rendered onto the display interface from a different perspective when a virtual camera is located at a center of the cuboid.

Exemplarily, when the uploaded image is an image of a certain scenic spot, and the application software already determines the corresponding completed image for the uploaded image, six different regions may be divided on the completed image, and a three-dimensional spatial coordinate system and a cuboid bounding box model composed of six blank patch textures may be constructed in the virtual space. For example, contents of the six portions on the completed image may be sequentially mapped to the six patches of the cuboid bounding box model in an order, so as to obtain the 3D image surrounding scenario.

It should be noted that in the process of mapping the pictures on the completed image onto the six patches of the cuboid bounding box, in order to ensure accuracy of mapping, a spherical model with the same center point as the cuboid bounding box may be constructed in the three-dimensional spatial coordinate system firstly. Based on this, attribute information (e.g., RGB values) of the plurality of pixel points on the completed image may be mapped to a surface of the sphere, a conversion relationship between a plurality of points on the surface of the sphere and a plurality of points on the cuboid bounding box may be determined based on a trigonometric function, and the attribute information of the plurality of pixel points on the surface of the sphere may be mapped to the six patches of the cuboid bounding box according to the conversion relationship, so as to achieve the effect of mapping the pictures in the six regions on the completed image onto the cuboid bounding box.

S120: determining, according to position information of a capturing device, a target perspective image from a 3D image surrounding scenario corresponding to the uploaded image.

In this embodiment, when determining the 3D image surrounding scenario corresponding to the uploaded image according to the completed image, the application software may fuse the pictures in the 3D image surrounding scenario with the image acquired in real time. In the actual application process, since the size of the display interface is limited, the image rendered on the interface only includes a portion of the 3D image surrounding scenario. Therefore, the application software further needs to determine the position information of the capturing device, so as to determine a corresponding picture in the 3D image surrounding scenario according to the information. It may be understood that the picture is the content that the user may see when the capturing device is located at the current position. The image including the picture is the target perspective image, and meanwhile, the target perspective image is also the image that needs to be fused with the picture acquired in real time and rendered onto the display interface.

For example, position information of the capturing device is acquired in real time or periodically; and a rotation angle of the capturing device is determined based on the position information, and the rotation angle is determined to correspond to the target perspective image in the 3D image surrounding scenario.

Here the position information is information used for reflecting a current perspective of the user, and the information is determined based on a gyroscope or an inertial measurement unit deployed in the capturing device. Those skilled in the art should understand that the gyroscope is an apparatus detecting angular movement around one or two axes orthogonal to an autorotation axis relative to inertia space by using a momentum sensitive shell of a high-speed rotor. Of course, an angular movement detecting apparatus fabricated on other principles and having the same function may also be referred to as a gyroscope. The inertial measurement unit is an apparatus measuring a three-axis attitude angle (or an angular speed) and acceleration of an object. Usually, one inertial measurement unit may include three single-axis accelerometers and three single-axis gyroscopes. The accelerometer detects an independent three-axis acceleration signal of an object in a carrier coordinate system, while the gyroscope detects an angular speed signal of the carrier relative to a navigation coordinate system and measures an angular speed and an acceleration of the object in the three-dimensional space, so as to calculate an attitude of the object at the current moment. Details will not be repeated here in the embodiments of the present disclosure.

In this embodiment, when the user uses a capturing device or a capturing apparatus on a mobile terminal to capture a video, the application may use a gyroscope or an inertial measurement unit to determine position information thereof in real time. For example, in the process of the user capturing the video, the above-described two apparatuses transmit the detected information to the application software in real time, so as to determine the position information in real time. It may be understood that in the case of determining the position information in real time, in the finally obtained effect video, the picture in the 3D image surrounding scenario that serves as the background may constantly change, or the gyroscope or the inertial measurement unit may periodically transmit the detected information to the application software, so as to determine position information corresponding to a plurality of time periods in the process of the user capturing the video. For example, the above-described apparatus transmits the detected information to the application every ten seconds, so that the application determines the position information. In the finally obtained effect video, the picture in the 3D image surrounding scenario that serves as the background may change every ten seconds. When deployed on the mobile terminal, the application periodically determines the position information, which may reduce computing resource consumption of the terminal, so as to improve processing efficiency of the effect video.

In this embodiment, when the position information is determined, a rotation angle of the capturing device may be determined according to the information, so that a specific picture may be determined in the 3D image surrounding scenario according to the angle. The image corresponding to the picture is the target perspective image. It may be understood that the content of the image is the portion that may be observed by the user in the 3D image surrounding scenario under the current attitude of the capturing device.

Exemplarily, by representing the position of the capturing device using an origin of the virtual three-dimensional spatial coordinate system and determining the position information thereof, the application may determine a portion of region corresponding to the current position information of the capturing device on the cuboid bounding box surrounding the origin. It may be understood that the picture of the portion of region is the picture that may be observed by the user at the current moment. For example, after constructing a blank image and reading information of a plurality of pixel points on a patch where the portion of region is located, the application may draw on the blank image according to the pixel point information, so as to obtain the target perspective image.

S130: generating and displaying an effect video frame based on the target perspective image and a target object, until receiving an operation to stop capturing an effect video.

In this embodiment, after determining the target perspective image, the application further needs to determine the target object in the video picture captured by the user in real time, in order to obtain the effect video. Here the target object in the video picture may be either dynamic or static, and meanwhile, the number of target objects may be one or more. For example, a plurality of specific users may be taken as target objects. Based on this, when recognizing facial features of one or more specific users in the video picture captured in real time based on a pre-trained image recognition model, the application may execute the effect video processing process according to the embodiments of the present disclosure.

In this embodiment, after determining the target perspective image and determining the target object in the video picture, the application may generate a corresponding effect video frame based on the above-described image data. Here the effect video frame may include a background image and a foreground image, the background image is the target perspective image, and the foreground image is a picture corresponding to the target object. It may be understood that the foreground image is superimposed on the background image, and may cover the entire region or a portion of region of the background image, so that the constructed effect video frame is more hierarchical. The process of generating the effect video frame will be illustrated below.

For example, the target object in the video frame to be processed is obtained, and the target object is fused with the target perspective image to obtain the effect video frame corresponding to the video frame to be processed.

For example, when obtaining the video captured by the user in real time and recognizing the target object from the picture, the application may parse the video to obtain the video frame to be processed corresponding to the current moment, for example, extract a view corresponding to the target object from the video frame to be processed based on a pre-written matting program. Those skilled in the art should understand that matting is a processing operation of separating an image from a certain portion of original image or video frame to obtain a separate image layer. In this embodiment, the view obtained through the matting processing is the image corresponding to the target object.

For example, after fusing the view including the target object with the target perspective image, an effect video frame corresponding to the video frame to be processed is obtained. Exemplarily, when recognizing a user serving as a target object in the video frame to be processed, the application may obtain a view that only includes the user through a matting processing operation. Meanwhile, since the application already determines the target perspective image in the 3D image surrounding scenario corresponding to a panoramic image of a certain scenic spot, the application may fuse a portion of picture of the scenic spot with the picture of the user on this basis, so as to obtain an effect video frame. It may be understood that the picture in the effect video frame may present a visual effect that the user is currently capturing a video in the scenic spot.

It should be noted that in the actual application process, the application may also display at least one 3D image surrounding scenario to be selected on the display interface, so as to determine the 3D image surrounding scenario based on a trigger operation for at least one 3D image surrounding scenario to be selected.

Exemplarily, 3D image surrounding scenarios corresponding to a variety of pictures may be pre-integrated within the application and stored in specific storage space or a cloud server associated with the application. For the user, these scenarios are the 3D image surrounding scenarios to be selected, for example, a 3D image surrounding scenario corresponding to a specific outdoor scenic spot and a 3D image surrounding scenario corresponding to an indoor exhibition hall. For example, a plurality of controls may be pre-developed, and each control is associated with a specific 3D image surrounding scenario and carries a specific identifier. For example, two controls may be pre-developed in the application, an identifier below the first control is the "scenic spot scenario," and an identifier below the second control is the "exhibition hall scenario." On this basis, when detecting the user triggering the first control, the application may invoke data associated with the control, that is, the 3D image surrounding scenario corresponding to the specific outdoor scenic spot, so as to execute the above-described effect video frame generation process. Of course, in the actual application process, the content and quantity of 3D image surrounding scenarios to be selected integrated in the application may be adjusted according to actual needs. Meanwhile, those skilled in the art should understand that the application may also store the 3D image surrounding scenario generated in real time according to the embodiments of the present disclosure as the 3D image surrounding scenario to be selected, and the user may invoke the scenario at any time, which will not be specifically limited in the embodiments of the present disclosure.

In this embodiment, after generating the effect video frame, the application may write the information of the plurality of pixel points in the effect video frame into a rendering engine, so that the rendering engine may render a corresponding picture on the display interface. Here the rendering engine is a program that controls a GPU rendering a relevant image, that is, may cause a computer to complete the task of drawing the effect video frame. Details will not be repeated here in the embodiments of the present disclosure.

In this embodiment, when detecting the operation to stop capturing an effect video, the application no longer executes the above-described processing steps according to the embodiments of the present disclosure. Here the operation to stop capturing the effect video includes at least one of: detecting that a stop-capturing control is triggered, detecting that a capturing duration of the effect video reaches a preset capturing duration, detecting that a wake-up word for stopping capturing is triggered, or detecting that a body movement for stopping capturing is triggered. The above-described conditions will be respectively illustrated below.

For example, with respect to the above-described first operation to stop capturing the effect video, a control may be pre-developed in the application software, meanwhile a program that terminates effect video processing may be associated with the control, and the control is the stop-capturing control. Based on this, when detecting the user triggering the control, the application software may invoke the relevant program to terminate the processing operation on a plurality of video frames to be processed at the current moment and after the moment. It may be understood that there are various ways for the user to trigger the control. Exemplarily, when the client is installed and deployed on the PC terminal, the user may trigger the stop-capturing control by clicking a mouse; and when the client is installed and deployed on the mobile terminal, the user may trigger the stop-capturing control through finger touch. Those skilled in the art should understand that the specific touch mode may be selected according to actual situations, which will not be specifically limited in the embodiments of the present disclosure.

With respect to the above-described second operation to stop capturing the effect video, the application may preset a duration as a preset capturing duration, and record a duration for the user to capture a video. For example, the application may compare the record result with the preset capturing duration, and may terminate the processing operation on a plurality of video frames to be processed at the current moment and after the moment when determining that the capturing duration of the user has reached the preset capturing duration.

With respect to the above-described third operation to stop capturing the effect video, specific information may be preset in the application software as a wake-up word to stop capturing, for example, one or more of words such as "stop," "stop capturing," and "stop processing" may be taken as the wake-up word to stop capturing. Based on this, when receiving voice information given out by the user, the application software may recognize the voice information by using a pre-trained voice recognition model and determine whether the recognition result includes one or more of the above-described preset effect mounting wake-up words, and the application may terminate the processing operation on a plurality of video frames to be processed at the current moment and after the moment when the result of determining is YES.

With respect to the above-described fourth operation to stop capturing the effect video, action information of persons may be entered into the application software, and the action information may be taken as the preset action information. For example, information reflecting an action of a person raising both hands may be taken as the preset action information. Based on this, when receiving an image or a video actively uploaded by the user or captured by using a camera apparatus in real time, the application may recognize the picture in images or a plurality of video frames based on a pre-trained body movement information recognition algorithm, and the application may terminate the processing operation on a plurality of video frames to be processed at the current moment and after the moment when the recognition result indicates that the body movement information of the target object in the current picture is consistent with the preset action information.

It should be noted that the above-described effect mounting conditions may take effect simultaneously in the application software, or only one or more of the effect mounting conditions may be selected to take effect in the application software, which will not be specifically limited in the embodiments of the present disclosure.

The technical solution of the embodiments of the present disclosure involves: obtaining an uploaded image in response to an effect trigger operation, that is, obtaining a data foundation used for generating a background of an effect video; determining, according to position information of a capturing device, a target perspective image from a 3D image surrounding scenario corresponding to the uploaded image; and generating and displaying an effect video frame based on the target perspective image and a target object, until receiving an operation to stop capturing an effect video. Thus, a portion of content in the image uploaded by the user serves as the background, which enables the effect video to present a visual effect of a scenario that the target object is located within the uploaded image, thereby enhancing fun of the effect video, and also achieving personalized needs of the user and improving user experience in the process of making the effect video.

Figure 2:
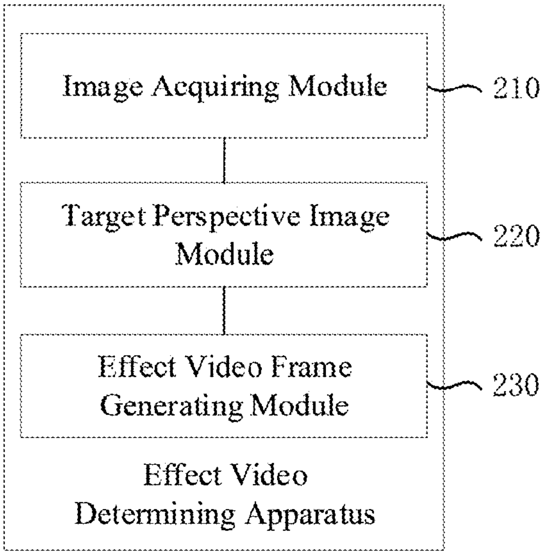
FIG. 2 is a schematic structural diagram of an effect video determining apparatus provided by an embodiment of the present disclosure.

FIG. 2 is a schematic structural diagram of an effect video determining apparatus provided by an embodiment of the present disclosure. As illustrated in FIG. 2, the apparatus includes: an image acquiring module 210, a target perspective image module 220, and an effect video frame generating module 230.

The image acquiring module 210 is configured to obtain an uploaded image in response to an effect trigger operation.

The target perspective image module 220 is configured to determine, according to position information of a capturing device, a target perspective image from a 3D image surrounding scenario corresponding to the uploaded image.

The effect video frame generating module 230 is configured to generate and display an effect video frame based on the target perspective image and a target object, until receiving an operation to stop capturing an effect video.

On the basis of the above-described technical solution, the image acquiring module 210 includes an image uploading box generation unit and an image determination unit.

The image uploading box generation unit is configured to pop up an image uploading box in response to the effect trigger operation.

The image determination unit is configured to determine the uploaded image based on a trigger operation on the image uploading box.

For example, the image determination unit is further configured to: invoke, in response to detecting that the image uploading box is triggered, an image library to take an image triggered to be selected in the image library as the uploaded image; or invoke, in response to detecting that the image uploading box is triggered, a camera apparatus to capture the uploaded image based on the camera apparatus.

On the basis of the above-described technical solution, the effect video determining apparatus further includes a pixel ratio information determination module, a completed image determination module, and a 3D image surrounding scenario determination module.

The pixel ratio information determination module is configured to determine pixel ratio information of the uploaded image.

The completed image determination module is configured to process the uploaded image to be a completed image with a target pixel ratio according to the pixel ratio information and a preset pixel ratio.

The 3D image surrounding scenario determination module is configured to determine the 3D image surrounding scenario based on the completed image, wherein the 3D image surrounding scenario is constructed by mapping at least six patches.

On the basis of the above-described technical solution, the 3D image surrounding scenario corresponds to a cuboid composed of the at least six patches.

For example, the completed image determination module is further configured to: in response to determining that the pixel ratio information is greater than the preset pixel ratio, perform pixel point filling processing by taking a long edge of the uploaded image as a filling reference to obtain the completed image with the target pixel ratio; or in response to determining that the pixel ratio information is greater than the preset pixel ratio, perform clipping processing on the uploaded image to obtain the completed image with the target pixel ratio.

For example, the completed image determination module is further configured to: determine a pixel filling width according to the target pixel ratio and the pixel ratio information; and perform, by taking one long edge of the uploaded image as a reference, pixel point filling according to the pixel filling width to obtain the completed image, or perform, by taking two long edges of the uploaded image as a reference, pixel point filling according to the pixel filling width to obtain the completed image, wherein a pixel value of a pixel point within the pixel filling width matches with a pixel value of a corresponding long edge.

For example, the completed image determination module is further configured to, in response to determining that the pixel ratio information is less than the preset pixel ratio, perform mirror processing on the uploaded image to obtain the completed image with the target pixel ratio.

For example, the 3D image surrounding scenario determination module is further configured to: determine six patch textures corresponding to a cuboid bounding box based on the completed image, and determine the 3D image surrounding scenario corresponding to the uploaded image based on the six patch textures.

On the basis of the above-described technical solution, the target perspective image module 220 includes a position information acquiring unit and a target perspective image determination unit.

The position information acquiring unit is configured to obtain the position information of the capturing device in real time or periodically, wherein the position information is determined based on a gyroscope or an inertial measurement unit equipped in the capturing device.

The target perspective image determination unit is configured to determine a rotation angle of the capturing device based on the position information and determine the rotation angle to correspond to the target perspective image in the 3D image surrounding scenario.

On the basis of the above-described technical solution, the effect video frame generating module 230 includes a target object acquiring unit and an effect video frame generation unit.

The target object acquiring unit is configured to obtain the target object in a video frame to be processed.

The effect video frame generation unit is configured to fuse the target object with the target perspective image to obtain the effect video frame corresponding to the video frame to be processed.

On the basis of the above-described technical solution, the effect video determining apparatus further includes a 3D image surrounding scenario display module.

The 3D image surrounding scenario display module is configured to display at least one 3D image surrounding scenario to be selected on a display interface, so as to determine the 3D image surrounding scenario based on a trigger operation for the at least one 3D image surrounding scenario to be selected.

On the basis of the above-described technical solution, the operation to stop capturing the effect video comprises at least one of: detecting that a stop-capturing control is triggered; detecting that a capturing duration of the effect video reaches a preset capturing duration; detecting that a wake-up word for stopping capturing is triggered; or detecting that a body movement for stopping capturing is triggered.

The technical solution provided by this embodiment involves: obtaining an uploaded image in response to an effect trigger operation, that is, obtaining a data foundation used for generating a background of an effect video; determining, according to position information of a capturing device, a target perspective image from a 3D image surrounding scenario corresponding to the uploaded image; and generating and displaying an effect video frame based on the target perspective image and a target object, until receiving an operation to stop capturing an effect video. Thus, a portion of content in the image uploaded by the user serves as the background, which enables the effect video to present a visual effect of a scenario that the target object is located within the uploaded image, thereby enhancing fun of the effect video, and also achieving personalized needs of the user and improving user experience in the process of making the effect video.

The effect video determining apparatus provided by the embodiments of the present disclosure may execute the effect video determining method provided by any embodiment of the present disclosure, and has corresponding functional modules and beneficial effects for executing the method.

It should be noted that the plurality of units and modules included in the above-described apparatus are only divided according to functional logic, but are not limited to the above-described division, as long as the corresponding functions may be implemented. In addition, specific names of the plurality of functional units are only intended to facilitate distinguishing them from each other, and are not used to limit the protection scope of the embodiments of the present disclosure.

Figure 3:
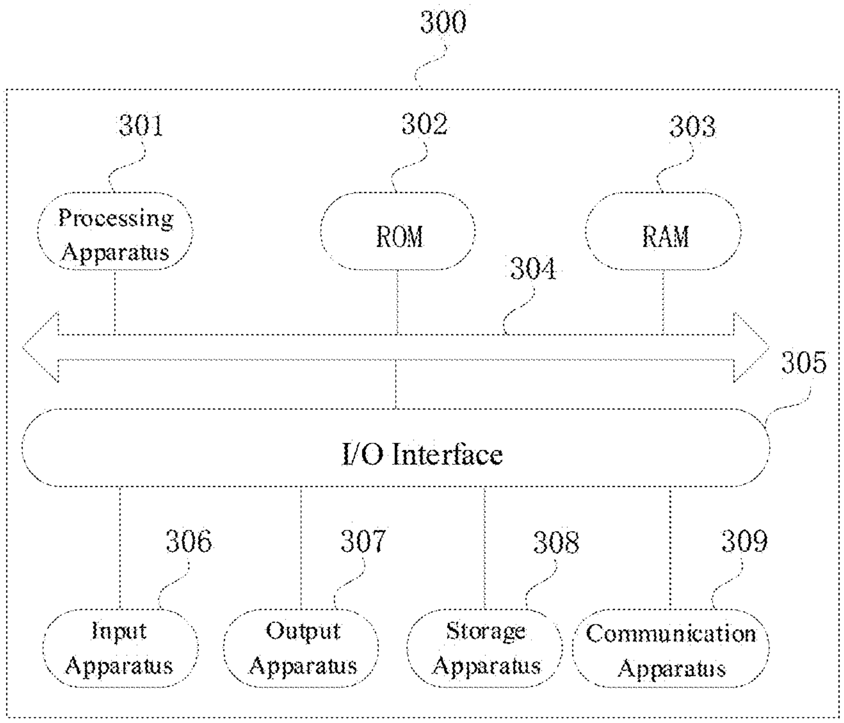
FIG. 3 is a schematic structural diagram of an electronic device provided by an embodiment of the present disclosure.

FIG. 3 is a schematic structural diagram of an electronic device provided by an embodiment of the present disclosure. Hereinafter, referring to FIG. 3, it shows a schematic structural diagram of an electronic device (e.g., a terminal device or a server in FIG. 3) 300 suitable for implementing the embodiments of the present disclosure. The terminal device in the embodiments of the present disclosure may include, but not limited to, mobile terminals, such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), etc., and fixed terminals, such as a digital television (TV), a desktop computer, etc. The electronic device shown in FIG. 3 is merely an example and should not impose any limitations on the functions and scope of use of the embodiments of the present disclosure.

As illustrated in FIG. 3, the electronic device 300 may include a processing apparatus 301 (e.g., a central processing unit, a graphics processing unit, etc.), which may execute various appropriate actions and processing according to a program stored on a read-only memory (ROM) 302 or a program loaded from a storage apparatus 308 into a random access memory (RAM) 303. The RAM 303 further stores various programs and data required for operation of the electronic device 300. The processing apparatus 301, the ROM 302, and the RAM 303 are connected with each other through a bus 304. An input/output (I/O) interface 305 is also connected to the bus 304.

Usually, apparatuses below may be connected to the I/O interface 305: an input apparatus 306 including, for example, a touch screen, a touch pad, a keyboard, a mouse, a camera, a microphone, an accelerometer, a gyroscope, or the like; an output apparatus 307 including, for example, a liquid crystal display (LCD), a speaker, a vibrator, or the like; a storage apparatus 308 including, for example, a magnetic tape, a hard disk, or the like; and a communication apparatus 309. The communication apparatus 309 may allow the electronic device 300 to perform wireless or wired communication with other electronic devices so as to exchange data. Although FIG. 3 shows the electronic device 300 having various apparatuses, it is not required to implement or have all the apparatuses illustrated, and the electronic device may alternatively implement or have more or fewer apparatuses.

Specifically, according to the embodiments of the present disclosure, the process described above with reference to the flowchart may be implemented as computer software programs. For example, the embodiments of the present disclosure include a computer program product, including a computer program carried on a non-transitory computer-readable medium, and the computer program includes program codes for executing the method shown in the flowchart. In such embodiments, the computer program may be downloaded and installed from the network via the communication apparatus 309, or installed from the storage apparatus 308, or installed from the ROM 302. When executed by the processing apparatus 301, the computer program may implement the above functions defined in the method provided by the embodiments of the present disclosure.

The names of messages or information exchanged between multiple apparatuses in the implementations of the present disclosure are only for illustrative purposes, and are not intended to limit the scope of these messages or information.

The electronic device provided by the embodiments of the present disclosure belongs to the same disclosed concept as the effect video determining method provided by the above-described embodiments. The technical details which are not described in detail in this embodiment may refer to the above-described embodiments, and this embodiment has the same advantageous effects as the above-described embodiments.

The embodiments of the present disclosure provide a computer storage medium, a computer program is stored on the computer storage medium, and the program, when executed by a processor, is configured to implement the effect video determining method provided by the above-described embodiments.

It should be noted that the computer-readable medium described in the present disclosure may be a computer-readable signal medium or a computer-readable storage medium, or any combination thereof. The computer-readable storage medium may be, but not limited to, an electric, magnetic, optical, electromagnetic, infrared, or semiconductor system, apparatus or device, or any combination thereof. For example, the computer-readable storage medium may include, but not limited to, an electrical connection with one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to, an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to, an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (for example, via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-described computer-readable medium may be included in the above-described electronic device, or may also exist alone without being assembled into the electronic device.

The above-mentioned computer-readable medium carries one or more programs, and the one or more programs, when executed by the electronic device, cause the electronic device to: obtain an uploaded image in response to an effect trigger operation;

determine, according to position information of a capturing device, a target perspective image from a 3D image surrounding scenario corresponding to the uploaded image; and generate and display an effect video frame based on the target perspective image and a target object, until receiving an operation to stop capturing an effect video.

The computer program codes for performing the operations of the present disclosure may be written in one or more programming languages or a combination thereof. The above-described programming languages include but are not limited to object-oriented programming languages, such as Java, Smalltalk, C++, and also include conventional procedural programming languages, such as the "C" programming language or similar programming languages. The program codes may by executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flow chart and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Here the name of the unit does not constitute a limitation of the unit itself under certain circumstances. For example, the first acquiring unit may also be described as "a unit that acquires at least two Internet protocol addresses."

The functions described herein above may be performed, at least partially, by one or more hardware logic components. For example, without limitation, available exemplary types of hardware logic components include: a field programmable gate array (FPGA), an application specific integrated circuit (ASIC), application specific standard parts (ASSP), a system on chip (SOC), a complex programmable logical device (CPLD), etc.

In the context of the present disclosure, the machine-readable medium may be a tangible medium containing or storing a program that can be used by or in combination with an instruction execution system, apparatus or device. The machine-readable medium may be a machine-readable signal medium or a machine-readable storage medium. The machine-readable medium may include, but not limited to, an electric, magnetic, optical, electromagnetic, infrared, or semiconductor system, apparatus or device, or any appropriate combination thereof. Examples of the machine-readable storage medium may include: an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them.

According to one or more embodiments of the present disclosure, Example 1 provides an effect video determining method, and the method includes:

obtaining an uploaded image in response to an effect trigger operation;

determining, according to position information of a capturing device, a target perspective image from a 3D image surrounding scenario corresponding to the uploaded image; and generating and displaying an effect video frame based on the target perspective image and a target object, until receiving an operation to stop capturing an effect video.

According to one or more embodiments of the present disclosure, in the effect video determining method provided by Example 2, obtaining the uploaded image in response to the effect trigger operation comprises:

popping up an image uploading box in response to the effect trigger operation; and determining the uploaded image based on a trigger operation on the image uploading box.

According to one or more embodiments of the present disclosure, in the effect video determining method provided by Example 3, determining the uploaded image based on the trigger operation on the image uploading box comprises:

invoking, in response to detecting that the image uploading box is triggered, an image library to take an image triggered to be selected in the image library as the uploaded image; or invoking, in response to detecting that the image uploading box is triggered, a camera apparatus to capture the uploaded image based on the camera apparatus.

According to one or more embodiments of the present disclosure, the effect video determining method provided by Example 4 further includes:

determining pixel ratio information of the uploaded image;

processing the uploaded image to be a completed image with a target pixel ratio according to the pixel ratio information and a preset pixel ratio; and determining the 3D image surrounding scenario based on the completed image, wherein the 3D image surrounding scenario is constructed by mapping at least six patches.

According to one or more embodiments of the present disclosure, in the effect video determining method provided by Example 5, the 3D image surrounding scenario corresponds to a cuboid composed of the at least six patches.

According to one or more embodiments of the present disclosure, in the effect video determining method provided by Example 6, processing the uploaded image to be the completed image with the target pixel ratio according to the pixel ratio information and the preset pixel ratio comprises:

in response to determining that the pixel ratio information is greater than the preset pixel ratio, performing pixel point filling processing by taking a long edge of the uploaded image as a filling reference to obtain the completed image with the target pixel ratio; or in response to determining that the pixel ratio information is greater than the preset pixel ratio, performing clipping processing on the uploaded image to obtain the completed image with the target pixel ratio.

According to one or more embodiments of the present disclosure, in the effect video determining method provided by Example 7, performing the pixel point filling processing by taking the long edge of the uploaded image as the filling reference to obtain the completed image with the target pixel ratio comprises:

determining a pixel filling width according to the target pixel ratio and the pixel ratio information; and performing, by taking one long edge of the uploaded image as a reference, pixel point filling according to the pixel filling width to obtain the completed image, or performing, by taking two long edges of the uploaded image as a reference, pixel point filling according to the pixel filling width to obtain the completed image, wherein a pixel value of a pixel point within the pixel filling width matches with a pixel value of a corresponding long edge.

According to one or more embodiments of the present disclosure, in the effect video determining method provided by Example 8, processing the uploaded image to be the completed image with the target pixel ratio according to the pixel ratio information and the preset pixel ratio comprises:

in response to determining that the pixel ratio information is less than the preset pixel ratio, performing mirror processing on the uploaded image to obtain the completed image with the target pixel ratio.

According to one or more embodiments of the present disclosure, in the effect video determining method provided by Example 9, determining the 3D image surrounding scenario based on the completed image comprises:

determining six patch textures corresponding to a cuboid bounding box based on the completed image; and determining the 3D image surrounding scenario corresponding to the uploaded image based on the six patch textures.

According to one or more embodiments of the present disclosure, in the effect video determining method provided by Example 10, determining, according to the position information of the capturing device, the target perspective image from the 3D image surrounding scenario corresponding to the uploaded image comprises:

obtaining the position information of the capturing device in real time or periodically, wherein the position information is determined based on a gyroscope or an inertial measurement unit equipped in the capturing device; and determining a rotation angle of the capturing device based on the position information, and determining the rotation angle to correspond to the target perspective image in the 3D image surrounding scenario.

According to one or more embodiments of the present disclosure, in the effect video determining method provided by Example 11, generating the effect video frame based on the target perspective image and the target object comprises:

obtaining the target object in a video frame to be processed; and fusing the target object with the target perspective image to obtain the effect video frame corresponding to the video frame to be processed.

According to one or more embodiments of the present disclosure, the effect video determining method provided by Example 12 further includes:

displaying at least one 3D image surrounding scenario to be selected on a display interface, so as to determine the 3D image surrounding scenario based on a trigger operation for the at least one 3D image surrounding scenario to be selected.

According to one or more embodiments of the present disclosure, in the effect video determining method provided by Example 13, the operation to stop capturing the effect video comprises at least one of:

detecting that a stop-capturing control is triggered;

detecting that a capturing duration of the effect video reaches a preset capturing duration;

detecting that a wake-up word for stopping capturing is triggered; or detecting that a body movement for stopping capturing is triggered.

According to one or more embodiments of the present disclosure, Example 14 provides an effect video determining apparatus, and the apparatus includes:

an image acquiring module, configured to obtain an uploaded image in response to an effect trigger operation;

a target perspective image module, configured to determine, according to position information of a capturing device, a target perspective image from a 3D image surrounding scenario corresponding to the uploaded image; and an effect video frame generating module, configured to generate and display an effect video frame based on the target perspective image and a target object, until receiving an operation to stop capturing an effect video.

In addition, although the plurality of operations are described in a particular order, this should not be understood as requiring the operations to be executed in the particular order shown or in a sequential order. Under certain circumstances, multitasking and parallel processing may be favorable. Similarly, although the above discussion includes a number of specific implementation details, these should not be interpreted as limiting the scope of the present disclosure. Certain features as described in the context of separate embodiments may also be implemented in a single embodiment in combination. Conversely, various features as described in the context of a single embodiment may also be implemented in a plurality of embodiments individually or in any suitable sub-combination.

The invention claimed is:

1. An effect video determining method, comprising:

obtaining an uploaded image in response to an effect trigger operation;

obtaining, according to position information of a capturing device, a perspective image from a 3D image surrounding scenario corresponding to the uploaded image; and generating and displaying an effect video frame based on the perspective image and an object, until receiving an operation to stop capturing an effect video, wherein the 3D image surrounding scenario corresponding to the uploaded image is obtained by:

obtaining pixel ratio information of the uploaded image;

processing the uploaded image to be a completed image with a first pixel ratio according to the pixel ratio information and a second pixel ratio; and obtaining the 3D image surrounding scenario based on the completed image, wherein the 3D image surrounding scenario is constructed by mapping at least six patches, wherein processing the uploaded image to be the completed image with the first pixel ratio according to the pixel ratio information and the second pixel ratio comprises:

in response to determining that the pixel ratio information is greater than the second pixel ratio, performing pixel point filling processing by taking a long edge of the uploaded image as a filling reference to obtain the completed image with the first pixel ratio; or in response to determining that the pixel ratio information is greater than the second pixel ratio, performing clipping processing on the uploaded image to obtain the completed image with the first pixel ratio, wherein performing the pixel point filling processing by taking the long edge of the uploaded image as the filling reference to obtain the completed image with the first pixel ratio comprises:

obtaining a pixel filling width according to the first pixel ratio and the pixel ratio information; and performing, by taking one long edge of the uploaded image as a reference, pixel point filling according to the pixel filling width to obtain the completed image; or performing, by taking two long edges of the uploaded image as a reference, pixel point filling according to the pixel filling width to obtain the completed image, and wherein a pixel value of a pixel point within the pixel filling width matches with a pixel value of a corresponding long edge.

2. The method according to claim 1, wherein obtaining the uploaded image in response to the effect trigger operation comprises:

popping up an image uploading box in response to the effect trigger operation; and obtaining the uploaded image based on a trigger operation on the image uploading box.

3. The method according to claim 2, wherein obtaining the uploaded image based on the trigger operation on the image uploading box comprises:

invoking, in response to detecting that the image uploading box is triggered, an image library to take an image triggered to be selected in the image library as the uploaded image; or invoking, in response to detecting that the image uploading box is triggered, a camera apparatus to capture the uploaded image based on the camera apparatus.

4. The method according to claim 1, wherein the 3D image surrounding scenario corresponds to a cuboid composed of the at least six patches.

5. The method according to claim 1, wherein processing the uploaded image to be the completed image with the first pixel ratio according to the pixel ratio information and the second pixel ratio comprises:

in response to determining that the pixel ratio information is less than the second pixel ratio, performing mirror processing on the uploaded image to obtain the completed image with the first pixel ratio.

6. The method according to claim 1, wherein obtaining the 3D image surrounding scenario based on the completed image comprises:

obtaining six patch textures corresponding to a cuboid bounding box based on the completed image; and obtaining the 3D image surrounding scenario corresponding to the uploaded image based on the six patch textures.

7. The method according to claim 1, wherein generating the effect video frame based on the perspective image and the object comprises:

obtaining the object in a video frame to be processed; and fusing the object with the perspective image to obtain the effect video frame corresponding to the video frame to be processed.

8. The method according to claim 1, further comprising:

displaying at least one 3D image surrounding scenario to be selected on a display interface, so as to obtain the 3D image surrounding scenario based on a trigger operation for the at least one 3D image surrounding scenario to be selected.

9. The method according to claim 1, wherein the operation to stop capturing the effect video comprises at least one of:

detecting that a stop-capturing control is triggered;

detecting that a capturing duration of the effect video reaches a first capturing duration;

detecting that a wake-up word for stopping capturing is triggered; or detecting that a body movement for stopping capturing is triggered.

10. The method according to claim 1, further comprising:

obtaining the position information of the capturing device in real time or periodically, wherein the position information is obtained based on a gyroscope or an inertial measurement unit equipped in the capturing device; and obtaining a rotation angle of the capturing device based on the position information, and obtaining the rotation angle to correspond to the perspective image in the 3D image surrounding scenario.

11. An electronic device, comprising:

one or more processors; and a storage apparatus, configured to store one or more programs, wherein the one or more programs, when executed by the one or more processors, cause the one or more processors to:

obtain an uploaded image in response to an effect trigger operation;

obtain, according to position information of a capturing device, a perspective image from a 3D image surrounding scenario corresponding to the uploaded image; and generate and display an effect video frame based on the perspective image and an object, until receiving an operation to stop capturing an effect video, wherein the 3D image surrounding scenario corresponding to the uploaded image is obtained by:

obtaining pixel ratio information of the uploaded image;

processing the uploaded image to be a completed image with a first pixel ratio according to the pixel ratio information and a second pixel ratio; and obtaining the 3D image surrounding scenario based on the completed image, wherein the 3D image surrounding scenario is constructed by mapping at least six patches, wherein processing the uploaded image to be the completed image with the first pixel ratio according to the pixel ratio information and the second pixel ratio comprises:

in response to determining that the pixel ratio information is greater than the second pixel ratio, performing pixel point filling processing by taking a long edge of the uploaded image as a filling reference to obtain the completed image with the first pixel ratio; or in response to determining that the pixel ratio information is greater than the second pixel ratio, performing clipping processing on the uploaded image to obtain the completed image with the first pixel ratio, wherein performing the pixel point filling processing by taking the long edge of the uploaded image as the filling reference to obtain the completed image with the first pixel ratio comprises:

obtaining a pixel filling width according to the first pixel ratio and the pixel ratio information; and performing, by taking one long edge of the uploaded image as a reference, pixel point filling according to the pixel filling width to obtain the completed image; or performing, by taking two long edges of the uploaded image as a reference, pixel point filling according to the pixel filling width to obtain the completed image, and wherein a pixel value of a pixel point within the pixel filling width matches with a pixel value of a corresponding long edge.

12. The electronic device according to claim 11, wherein obtaining the uploaded image in response to the effect trigger operation comprises:

popping up an image uploading box in response to the effect trigger operation; and obtaining the uploaded image based on a trigger operation on the image uploading box.

13. The electronic device according to claim 12, wherein obtaining the uploaded image based on the trigger operation on the image uploading box comprises:

invoking, in response to detecting that the image uploading box is triggered, an image library to take an image triggered to be selected in the image library as the uploaded image; or invoking, in response to detecting that the image uploading box is triggered, a camera apparatus to capture the uploaded image based on the camera apparatus.

14. The electronic device according to claim 11, wherein the 3D image surrounding scenario corresponds to a cuboid composed of the at least six patches.

15. The electronic device according to claim 11, wherein processing the uploaded image to be the completed image with the first pixel ratio according to the pixel ratio information and the second pixel ratio comprises:

in response to determining that the pixel ratio information is less than the second pixel ratio, performing mirror processing on the uploaded image to obtain the completed image with the first pixel ratio.

16. The electronic device according to claim 11, wherein obtaining the 3D image surrounding scenario based on the completed image comprises:

obtaining six patch textures corresponding to a cuboid bounding box based on the completed image; and obtaining the 3D image surrounding scenario corresponding to the uploaded image based on the six patch textures.

17. The electronic device according to claim 11, wherein generating the effect video frame based on the perspective image and the object comprises:

obtaining the object in a video frame to be processed; and fusing the object with the perspective image to obtain the effect video frame corresponding to the video frame to be processed.

18. The electronic device according to claim 11, wherein the one or more processors are further caused to:

display at least one 3D image surrounding scenario to be selected on a display interface, so as to obtain the 3D image surrounding scenario based on a trigger operation for the at least one 3D image surrounding scenario to be selected.

19. The electronic device according to claim 11, wherein the operation to stop capturing the effect video comprises at least one of:

detecting that a stop-capturing control is triggered;

detecting that a capturing duration of the effect video reaches a first capturing duration;

detecting that a wake-up word for stopping capturing is triggered; or detecting that a body movement for stopping capturing is triggered.

20. A non-transitory storage medium comprising computer-executable instructions, wherein the computer-executable instructions, when executed by a computer processor, are configured to:

obtain an uploaded image in response to an effect trigger operation;

obtain, according to position information of a capturing device, a perspective image from a 3D image surrounding scenario corresponding to the uploaded image; and generate and display an effect video frame based on the perspective image and an object, until receiving an operation to stop capturing an effect video, wherein the 3D image surrounding scenario corresponding to the uploaded image is obtained by:

obtaining pixel ratio information of the uploaded image;

processing the uploaded image to be a completed image with a first pixel ratio according to the pixel ratio information and a second pixel ratio; and obtaining the 3D image surrounding scenario based on the completed image, wherein the 3D image surrounding scenario is constructed by mapping at least six patches, wherein processing the uploaded image to be the completed image with the first pixel ratio according to the pixel ratio information and the second pixel ratio comprises:

in response to determining that the pixel ratio information is greater than the second pixel ratio, performing pixel point filling processing by taking a long edge of the uploaded image as a filling reference to obtain the completed image with the first pixel ratio; or in response to determining that the pixel ratio information is greater than the second pixel ratio, performing clipping processing on the uploaded image to obtain the completed image with the first pixel ratio, wherein performing the pixel point filling processing by taking the long edge of the uploaded image as the filling reference to obtain the completed image with the first pixel ratio comprises:

obtaining a pixel filling width according to the first pixel ratio and the pixel ratio information; and performing, by taking one long edge of the uploaded image as a reference, pixel point filling according to the pixel filling width to obtain the completed image; or performing, by taking two long edges of the uploaded image as a reference, pixel point filling according to the pixel filling width to obtain the completed image, and wherein a pixel value of a pixel point within the pixel filling width matches with a pixel value of a corresponding long edge.

* * * * *